June 26, 1973 C. G. JOA 3,741,842
METHOD FOR THE FABRICATION OF AN ABSORBENT
PAD WITH A BODY CONTACTING COVER
Original Filed Aug. 15, 1969 4 Sheets-Sheet 3
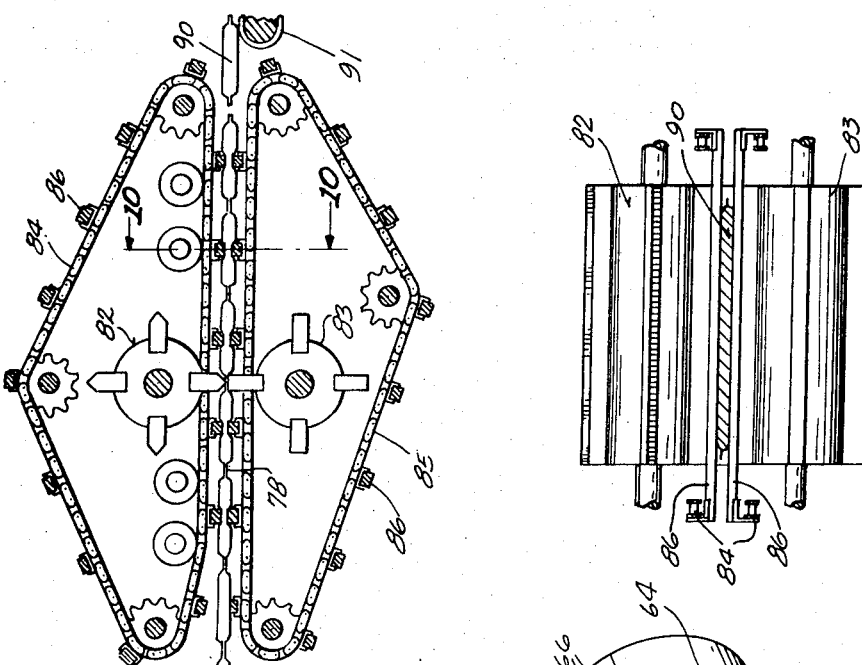
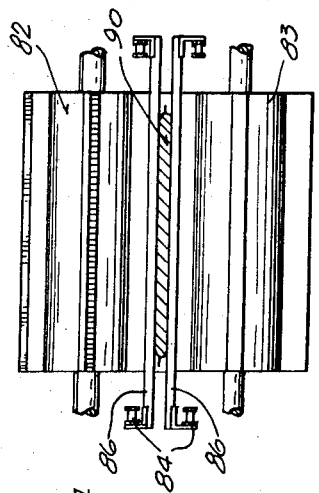
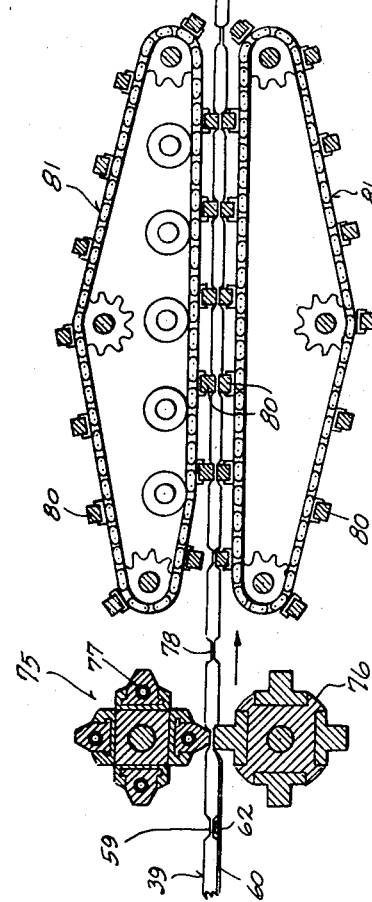
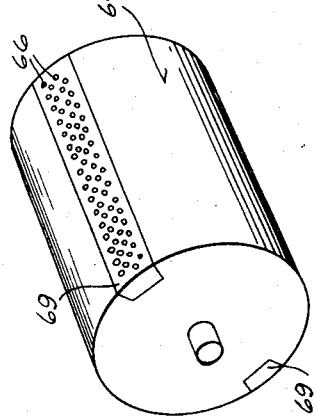
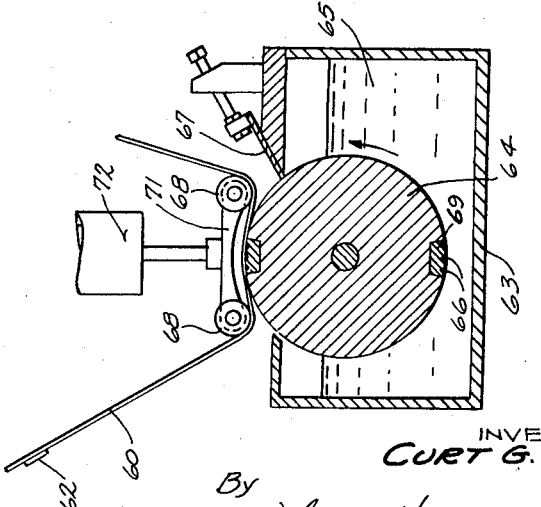
INVENTOR
CURT G. JOA
By
Wheeler, House & Wheeler
ATTORNEYS.

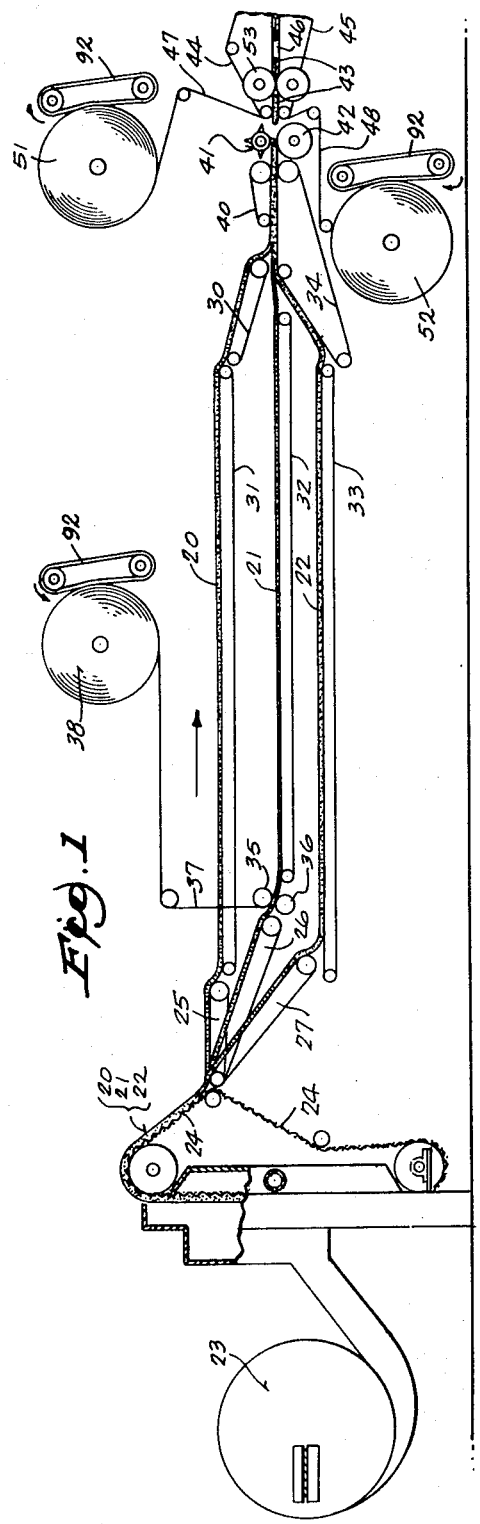
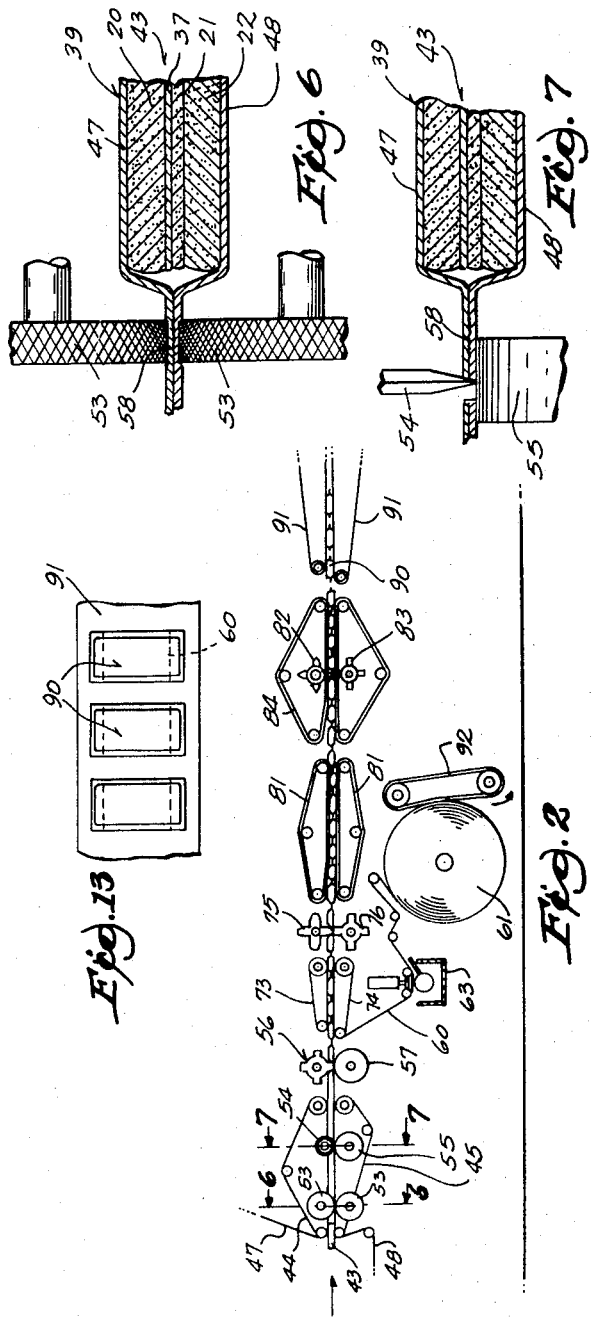

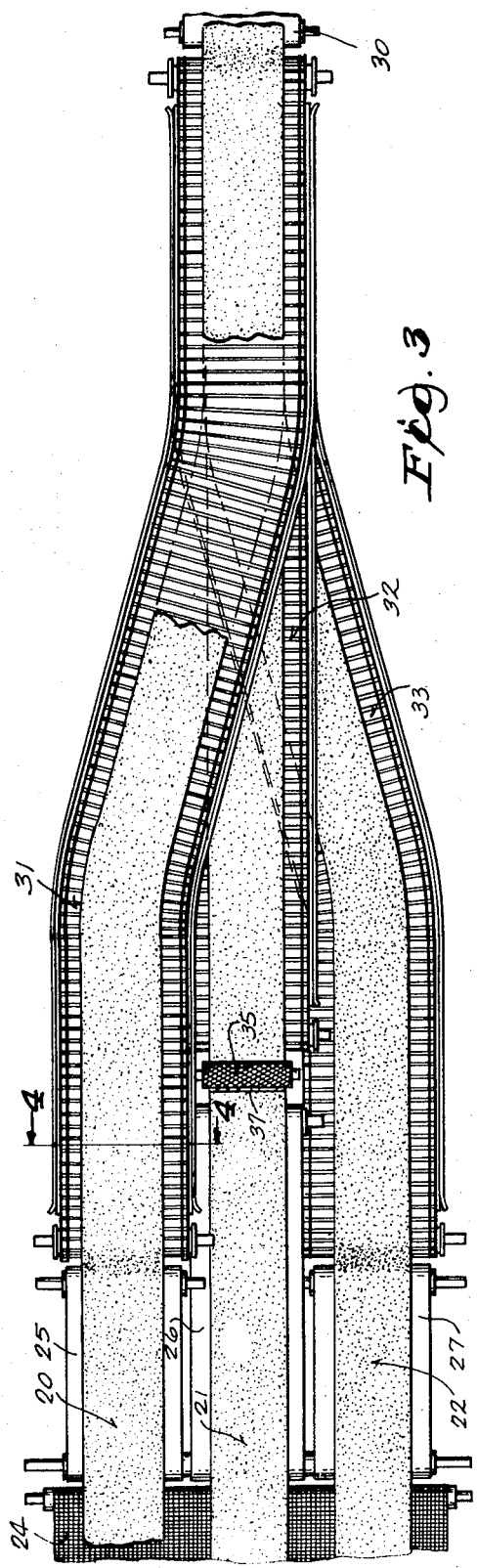
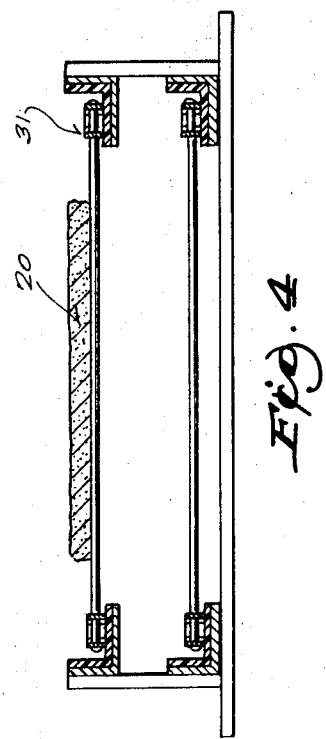

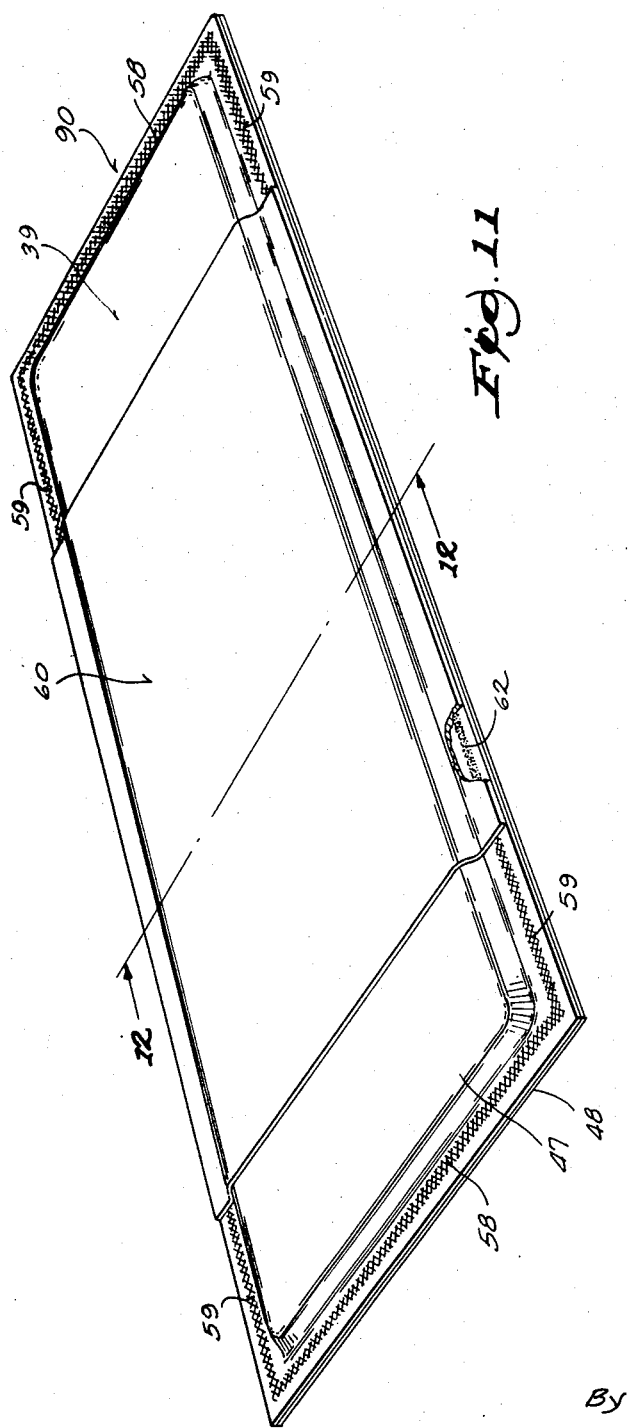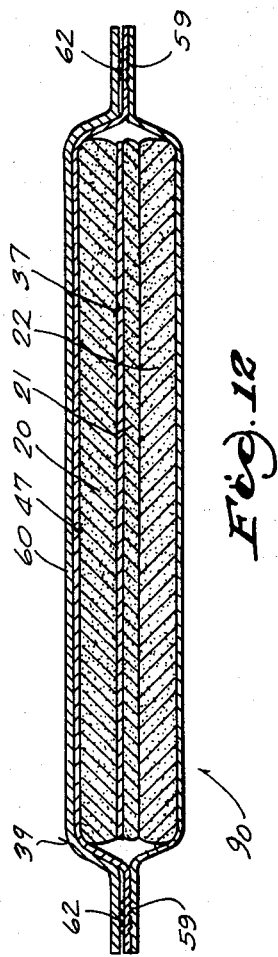

United States Patent Office 3,741,842
Patented June 26, 1973

3,741,842
METHOD FOR THE FABRICATION OF AN ABSORBENT PAD WITH A BODY CONTACTING COVER
Curt G. Joa, Ocean Ridge, Fla.
(P.O. Box 1121, Boynton Beach, Fla. 33435)
Original application Aug. 15, 1969, Ser. No. 850,482, now Patent No. 3,666,611. Divided and this application Apr. 5, 1971, Ser. No. 131,550
Int. Cl. B32b 5/18
U.S. Cl. 156—213                                    11 Claims

ABSTRACT OF THE DISCLOSURE

Absorbent pad having a pulp filler, wadding envelope, and body contacting cover outside the envelope which is shorter than the pad is long, thus to leave end margins of the pad uncovered. The apparatus and method for fabricating such a pad involves superimposing separate pulp mats, one of which is compressed before superimposition in order that the compressed mat functions as a flow distribution ply, subdividing the superimposed mats into discrete pad fillers with gaps therebetween, encasing the spaced pad fillers in a wadding envelope which is continuous across the gaps, cross sealing the envelope across the gaps to form a continuous wadding envelope tube with links interconnecting the spaced filler pads, and applying the body contacting cover sheet thereto.

CROSS-REFERENCE TO RELATED APPLICATION

This application is a division of my copending application Ser. No. 850,482 filed Aug. 15, 1969, now U.S. Pat. No. 3,666,611.

SUMMARY OF THE INVENTION

In accordance with the present invention, an improved pad is produced which has a central compressed or embossed pulp layer which enhances longitudinal and lateral flow distribution and an external body contacting cover sheet which is made shorter than the pad is long in order to cover only the central part of the pad and leave end margins of the envelope exposed. The body contacting cover desirably comprises a smooth strip of non-woven fabric which is worn against the body and prevents pilling of the pulp and wadding.

In fabricating the pad, multiple lanes of pulp mat are stripped off of a forming screen onto the laterally adjacent ends of horizontally flexible conveyors. The opposite ends of these conveyors are brought into vertically overlapping relation by horizontally flexing intermediate portions of the conveyors. In the disclosed embodiment, three mats are superimposed. The top and bottom mats are left uncompressed. An intermediate pulp mat is compressed and densified by embossing rolls prior to combining it with the top and bottom layers. This technique reduces the thickness of the ultimate pad, thus to make it easier to bend and fold the pad to fit body contour. Moreover, the compressed layer has increased capillarity, thus to promote lateral distribution of fluids outwardly from the pad center and toward its edges, thus to promote uniform absorption throughout the pad body.

The present invention is distinguished from certain prior art pads in which a wadding envelope is made from a single strip folded about one edge of the pad. In such pads, the edge folding subjects the wadding to tension, with undesirable stretching of the wadding. In the present invention, the wadding envelope is formed from separate upper and lower wadding strips which are power fed to eliminate pulling tension which might otherwise deform the strips. The upper and lower wadding strips are laid flat against the upper and lower surfaces of the composite pad. The side and end margins of the strips which extend laterally beyond the pad filler are sealed in face relationship. This eliminates all edge folding and pulling stresses on the wadding.

The pad fillers are longitudinally spaced prior to encasement in the wadding envelope and the gaps between pad fillers are sealed with cross seals, thus to form a continuous wadding tube with longitudinally spaced discrete wadding encased pad fillers connected by wadding links. The body contacting cover strip is then fed in face relation against one side of the continuously moving tube and has cross bands of hot melt adhesive printed thereon in registry with the links. The superimposed tube and body contacting cover strip pass between a hot melt adhesive activating roll set which activates the adhesive and bonds the cover strip to the links. Thereafter, the links are severed through the bond to produce discrete pads with the characteristics hereinbefore described.

The pad in various appropriate sizes may be used as a hospital underpad, diaper, sanitary napkin, etc.

Other objects, features, and advantages of the invention will appear from the following disclosure.

DESCRIPTION OF DRAWINGS

FIG. 1 is a somewhat diagrammatic side view showing transfer of the pulp mats from the forming screen onto the flexible conveyors and to a point in the fabrication of the pad slightly beyond where the wadding strips are introduced, this view being then broken off and continued in FIG. 2.

FIG. 2 is a continuation of FIG. 1 showing further progress of the ensleeved pads. This view shows how the body contacting cover is applied and the ensleeved pad fillers are severed into discrete pads.

FIG. 3 is an enlarged fragmentary plan view of a portion of FIG. 1 and showing the multiple pad mats stripped from the forming screen and overlapped by the horizontally flexible conveyors.

FIG. 4 is a cross section taken along the line 4—4 of FIG. 3.

FIG. 5 is a somewhat enlarged side view showing the apparatus for conveying the pad tube through the hot melt reactivating rolls and the pad severing knives.

FIG. 6 is an enlarged fragmentary cross section taken along the line 6—6 of FIG. 2.

FIG. 7 is an enlarged fragmentary cross section taken along the line 7—7 of FIG. 2.

FIG. 8 is an enlarged view, partly in cross section, of the hot melt printing apparatus for the body contacting cover strip.

FIG. 9 is a perspective view of the printing roll of FIG. 8.

FIG. 10 is a cross section taken along the line 10—10 of FIG. 5.

FIG. 11 is an inverted perspective view of a pad embodying the present invention.

FIG. 12 is a cross section taken along the line 12—12 of FIG. 11.

FIG. 13 is a digrammatic plan view showning the orientation of the pads on the conveyor.

DESCRIPTION OF PREFERRED EMBODIMENT

Althoughthe disclosure hereof is detailed and exact to enable those skilled in the art to practice the invention, the physical embodiments herein disclosed merely exemplify the invention which may be embodied in other specific structure. The scope of the invention is defined in the claims appended hereto.

In the embodiment illustrated, three pulp mats 20, 21, 22 are formed on a fiberizer 23 of the general construction shown in U.S. Pat. 3,268,954 and are removed from the fiberizer on a screen 24. As best shown in FIG. 3, the respective mats 20, 21, 22 are stripped from the screen 24 onto belt conveyors 25, 26, 27. These belt conveyors transfer the mats onto the intake ends of horizontally flexible conveyors 31, 32, 33. These conveyors are illustrated only diagrammatically in this application. Any suitable form of flexible conveyor can be used. See, for example, the flexible conveyors shown in U.S. Pats. 2,872,023, 3,225,898 and 3,439,795, the disclosures of which are incorporated herein by reference.

The flexible conveyor belts 31, 32, 33 are flexed horizontally as shown in FIG. 3 so that their discharge ends overlap vertically. Thus, the respective mat strips 20, 21, 22 are deposited one on top of the other on a takeoff conveyor 34.

It is an important feature of the present invention that the intermediate pulp mat 21 is passed between compression or embossing rolls 35, 36, thus to compress the intermediate mat 21 to less than about one-third of its normal thickness, thus densifying the intermediate mat to produce in the ultimate product an intermediate densified layer which promotes distribution of fluids laterally in the pad. Moreover, the compression of the intermediate pulp mat 21 reduces the over-all thickness of the pad, thus to facilitate bending and folding the pad to fit body contours. While in the disclosed embodiment compressed mat ply 21 is substantially coextensive in area with the uncompressed pulp plies 20, 22, it may be made smaller in one or both its length and width dimensions.

Incorporated immediately on top of the intermediate compressed mat 21 is a strip of wadding 37 taken from a parent roll 38. The wadding strip 37 is fed beneath the compression roller 35 and occupies a position in the pad as shown in FIG. 12.

Top mat 20 is led down by belt conveyor 30, and bottom mat 22 is led up by conveyor 34 to their intersection where all mats join and are fed beneath cooperating overlying conveyor 40 to a pulp filler cutoff roller 41 and its underlying platen roller 42. Rollers 41, 42 cut the mats into discrete pulp pad fillers 43 which continue on into the apparatus best shown in FIG. 2.

The discrete pulp fillers 43 are conveyed between an upper conveyor belt 44 and a lower conveyor belt 45. Belts 44, 45 run at a slightly faster speed than the belts 34, 40, thus to produce gaps 46 between successive fillers. The pulp fillers are further enclosed within a wadding tube or envelope 39 comprising an upper wadding strip 47 and a lower wadding strip 48 which respectively unwind from parent rolls 51, 52.

Strips 47, 48 are slightly wider than the pulp filler 43. Thus, their side margins are crimped together at 58 by the crimping rolls 53 shown in FIG. 6. Edge waste is cut off by the combination of a knife roll 54 and a platen roll 55, as shown in FIG. 7. In this manner the fillers 43 are entubed in a generally flat wadding envelope 39 which consists of two strips of wadding laminated in face relation at the edges of the tube.

Beyond the belts 44, 45 the respective fillers 43 are sealed in the envelope 39 crossways by the cross crimping roller 56 which cooperates with its platen roll 57, thus to produce cross sealed bands 59 each pad filler 43 within the tube 39.

The tube 39 then passes through conveyor belts 73, 74, where a body contacting cover strip 60 is assembled in face relation to the underside of the envelope. Strip 60 desirably consists of smooth, soft, non-woven fabric unwound from a parent roll 61. The strip 60 has periodically printed upon it a cross band or stripe 62 (FIG. 8) of hot melt adhesive, applied thereto by printing roll 64 in the hot melt adhesive tank 63. Printing roll 64 is immersed in a molten adhesive bath 65. The printing roll 64 has embedded in its periphery intaglio printing bars 69 which have dimpled surfaces 66 to retain adhesive picked up in the bath 65. A doctor blade 67 scrapes from the periphery of the roll 64 all of the hot adhesive, except such as is retained beneath its surface in the dimples 66.

The cover strip 60 is narrower than the envelope 39 (FIG. 11) and is fed at a lineal speed equal to the peripheral speed of the printing roll 64 and across the roller guides 68 mounted on a carriage 71 on the retractable piston and cylinder assembly 72. The cover strip 60 is fed at the same speed as feed belts 73, 74. The printing bars 69 on roller 64 are spaced peripherally a distance exactly equaling the intergap spaces in tube 39. Thus, the printed cross stripes or band 62 register with the tube gaps.

The hot melt adhesive cross bands 62 cool and solidify in the course of traveling through the apparatus until they reach an adhesive activating roll set consisting of a heated roll 75 and a platen roll 76. There are a series of heating bars 77 on the roll 75. Bars 77 coact with the tube 39 in the gaps between successive pads so as to activate the bands 62 and cause the body contacting cover strip 60 to adhere to the previously crimped cross bands on the tube. As the tube leaves the cross band activator 75, the links 78 between successive pads in the tube 39 will be gripped by the gripping bars 80 on the upper and lower chain feeders 81 (FIG. 5). The bars 80 cool and set the activated adhesive bands 62. Feeders 81 transfer the tube 39 to the final cutoff station which includes knife roll 82 and platen roll 83. The rolls 82, 83 are intermediate the ends of conveyor chains 84, 85 which have pad gripping bars 86. Bars 86 are so positioned as to grip the pads, as shown in FIG. 5, thus leaving the links 78 between the pads exposed to be cut off as they pass between the knife roller 82 and platen roller 83. The final severed pad product 90 is then removed on a conveyor 91. FIG. 13 illustrates the fact that the pads 90 are formed with their longest dimension transverse to the direction of advance of tube 39 through the machine.

The final pad product is shown in FIGS. 11 and 12 (inverted as compared to previous views). As is clear from FIG. 11, the body contacting cover strip 60 is not as long as the pad, thus to leave the end margins of the pad uncovered. Moreover, the strip 60 is applied to only one face of the pad. This construction is particularly advantageous where the pad 90 is used as a diaper and the diaper is folded about the baby. Accordingly, the body contacting cover 60 is located only over the central portion of the diaper which becomes soiled and wet, thus to prevent pilling of the pulp and wadding in that affected area. A substantial saving is thus made in the amount of cover material needed for each pad.

An important feature of the present invention is the method and apparatus by which undue stresses on the wadding strips 37, 47, 48 are avoided. In the first place, the wadding strips are not folded around the edges of the pads as in some prior art pads. Such folding produces tension in the wadding, thus tending to stretch the wadding and possibly pull it out of shape or tear it. In the present apparatus and method, the wadding strips are simply laid in parallel superimposed relation. The edge margins of strips 47, 48 are overlapped and crimped, as shown in FIG. 6. This avoids any necessity for stretching or imposing pressure on the wadding as would otherwise be required if it were folded or pulled around the edges of the pad.

Moreover, each wadding strip is relieved of the necessity for pulling it from the parent rolls 38, 51, 52. This is accomplished by providing each parent roll with a powered belt driver 92. The belt drivers 92 drive the parent rolls so as to unwind the strips under power, and relieve the strips of tension which would otherwise be induced in the strips. Accordingly, for this additional reason, the wadding strips are not streched or otherwise distorted in the course of formtion of the tube in which the pad fillers are encased.

The completed pad, as shown in FIGS. 11 and 12, contains a mid layer 21 of compressed pulp and outside layers 20, 22 of uncompressed pulp. The compressed layer 21 promotes rapid lateral flow of fluids, thus to promote uniform absorption of fluid in all of the pulp material in the pad.

What is claimed is:

1. In a method of fabricating pads in which layers of pulp mat are superimposed, subdivided into discrete pad fillers with gaps therebetween, encased in a wadding envelope which is continuous across said gaps, and the wadding sealed across said gaps to form a continuous wadding envelope tube with spaced discrete encased filler pads with wadding links therebetween, the improvement in which a body contacting cover is applied to one outside face of the envelope tube, printing spaced bands of adhesive on the cover prior to applying the cover to the envelope tube, said bands being spaced to register with the wadding links of the tube, sealing the adhesive bands to the links and severing the tube across said links to produce discrete pads with a body contacting cover at one face thereof.

2. The method of claim 1 in which said body contacting cover is narrower than the envelope tube, thus to leave margins of the tube exposed at both sides of the cover.

3. In a method of fabricating pads in which layers of pulp mat are superimposed, subdivided into discrete pad fillers with gaps therebetween, encased in a wadding envelope which is continuous across said gaps, and the wadding sealed across said gaps to form a continuous wadding envelope tube with spaced discrete encased filler pads with wadding links therebetween, the improvement in which a body contacting cover is applied to one face of the tube, printing spaced bands of adhesive on the cover to register with the wadding links of the tube, sealing the adhesive bands to the links and severing the tube across said links to produce discrete pads with a body contacting cover at one face thereof, said bands of adhesive being printed on the cover by a roller having printing and on-printing areas, guiding the cover over the roller and rotating the roller in a bath of hot melt adhesive.

4. The method of claim 3 in which the adhesive bonds are sealed to the links by activating the hot melt adhesive in said bands after the cover is applied to the tube.

5. In a method for fabricating pads in which layers of pulp mats are superimposed, subdivided into discrete pad fillers with gaps therebetween and encased in a wadding envelope which is continuous across said gaps, the improvement for encasing said pad fillers without imposing substantial stretching forces on the wadding envelope and comprising feeding upper and lower strips of wadding about the discrete spaced pad fillers, registering the edges of said wadding strips and sealing said edges in face relation and cross sealing the wadding strips across the gaps between the spaced pad fillers to form a tube of encased pad fillers with wadding links therebetween, plus the step of feeding a body contacting cover strip into face relation with one side of the tube, printing cross bands of hot melt adhesive on the cover strip to register with said links, activating said bands to seal the bands to the links and severing the links through said bands.

6. The method of claim 5 in which said body contacting strip is narrower than the envelope, thus to leave margins of the envelope exposed at both sides of the cover strip.

7. The method of claim 5 in which the step of activating the bands to seal the bands to the links comprises passing the tube between heated embossing bars which contact the links as the tube passes therebetween.

8. The method of claim 7 in which the tube is conveyed forwardly beyond said embossing bars by coacting chains having registering clamping bars which clamp on the links between pads, the severing of the links through the bands being effected by feeding the links between coacting chains having bars registering with the pad fillers and a severing knife which coacts with the links between the fillers.

9. In a method for fabricating pads in which three layers of pulp mats are superimposed, subdivided into discrete pad fillers with gaps therebetween and encased in a wadding envelope which is continuous across said gaps, the improvement for encasing said pad fillers without imposing substantial stretching forces on the wadding envelope and comprising feeding upper and lower strips of wadding about the discrete spaced pad fillers, registering the edges of said wadding strips and sealing said edges in face relation and cross sealing the wadding strips across the gaps between the spaced pad fillers to form a tube of encased pad fillers with wadding links therebetween, plus the step of compressing the middle layer prior to superimposing the layers so that said middle layer is denser than the other layers.

10. The method of claim 9 plus the step of feeding a strip of wadding into face relation with the compressed middle pulp layer, prior to superimposing said layers.

11. In a method for fabricating pads in which layers of pulp mats are superimposed, subdivided into discrete pad fillers with gaps therebetween and encased in a wadding envelope which is continuous across said gaps, the improvement for encasing said pad fillers without imposing substantial stretching forces on the wadding envelope and comprising feeding upper and lower strips of wadding about the discrete spaced pad fillers, registering the edges of said wadding strips and sealing said edges in face relation and cross sealing the wadding strips across the gaps between the spaced pad fillers to form a tube of encased pad fillers with wadding links therebetween, stripping said layers off of a mat forming screen onto horizontally flexible conveyors and flexing said conveyors horizontally into vertically overlapped relation to superimpose said layers.

References Cited

UNITED STATES PATENTS

| 3,629,039 | 12/1971 | Frick | 156—269 |
|---|---|---|---|
| 2,682,873 | 7/1954 | Evans et al. | 128—296 X |

FOREIGN PATENTS

| 884,194 | 12/1961 | Great Britain | 19—144.5 |
|---|---|---|---|
| 884,195 | 12/1961 | Great Britain | 19—144.5 |

ALFRED L. LEAVITT, Primary Examiner

D. A. SIMMONS, Assistant Examiner

U.S. Cl. X.R.

19—144.5; 156—199, 250, 269, 291, 301